US012794817B2

(12) United States Patent
Allal et al.

(10) Patent No.: US 12,794,817 B2
(45) Date of Patent: Nov. 10, 2026

(54) METHOD FOR DISCRIMINATING A MESSAGE BETWEEN A TERMINAL AND A DATA SERVER

(71) Applicant: Orange, Issy-les-Moulineaux (FR)

(72) Inventors: Imed Allal, Chatillon Cedex (FR); Emile Stephan, Chatillon Cedex (FR); Gaël Fromentoux, Chatillon Cedex (FR); Arnaud Braud, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 324 days.

(21) Appl. No.: 18/007,952

(22) PCT Filed: Jun. 1, 2021

(86) PCT No.: PCT/FR2021/050993
§ 371 (c)(1),
(2) Date: Dec. 2, 2022

(87) PCT Pub. No.: WO2021/245351
PCT Pub. Date: Dec. 9, 2021

(65) Prior Publication Data

US 2023/0262004 A1 Aug. 17, 2023

(30) Foreign Application Priority Data

Jun. 4, 2020 (FR) ...................................... 2005865

(51) Int. Cl.
*H04L 47/2475* (2022.01)
*H04L 9/40* (2022.01)

(52) U.S. Cl.
CPC ...... *H04L 47/2475* (2013.01); *H04L 63/0236* (2013.01)

(58) Field of Classification Search
CPC ............. H04L 47/2475; H04L 63/0236; H04L 63/0227; H04L 47/35; H04W 12/088
See application file for complete search history.

(56) References Cited

U.S. PATENT DOCUMENTS 9,083,740 B1 * 7/2015 Ma ........................ H04L 63/145
2005/0177506 A1 8/2005 Rissanen
(Continued)

FOREIGN PATENT DOCUMENTS

EP 1376984 A1 1/2004
WO WO-2008015379 A1 * 2/2008 ......... H04L 12/5695
WO 2016173635 A1 11/2016

OTHER PUBLICATIONS

International Preliminary Report on Patentability and English translation of the Written Opinion dated Dec. 6, 2022, for corresponding International Application No. PCT/FR2021/050993, filed Jun. 1, 2021.

(Continued)

*Primary Examiner* — Mandish K Randhawa
(74) *Attorney, Agent, or Firm* — David D. Brush; Westman, Champlin & Koehler, P.A.

(57) ABSTRACT

A method for discriminating a first message concerning a first application from among a set of messages concerning a plurality of applications, transmitted by a terminal device to a data server via a routing device, able to apply a processing operation to an attribute in relation to the first message. The method is implemented by the terminal device and includes: adding an attribute in relation to the first message to an information packet, the packet grouping attributes to which the processing operation is applied; applying a tag to the information packet including the added attribute; and transmitting the information packet comprising the applied tag to the data server.

14 Claims, 7 Drawing Sheets

(56) References Cited

U.S. PATENT DOCUMENTS

2018/0109503 A1* 4/2018 Nádas ................. H04L 63/0428
2021/0006642 A1* 1/2021 He .......................... H04L 43/16

OTHER PUBLICATIONS

International Search Report dated Aug. 26, 2021 for corresponding International Application No. PCT/FR2021/050993, filed Jun. 1, 2021.
Written Opinion of the International Searching Authority dated Aug. 26, 2021 for corresponding International Application No. PCT/FR2021/050993, filed Jun. 1, 2021.
Zou Zhichao et al., "A Real-Time Network Traffic Identifier for Open 5G/B5G Networks via Prototype Analysis", 2019 IEEE Globecom Workshops (GC Wkshps), IEEE, Dec. 9, 2019 (Dec. 9, 2019), p. 1-6, XP033735031.

* cited by examiner

[Fig. 1]
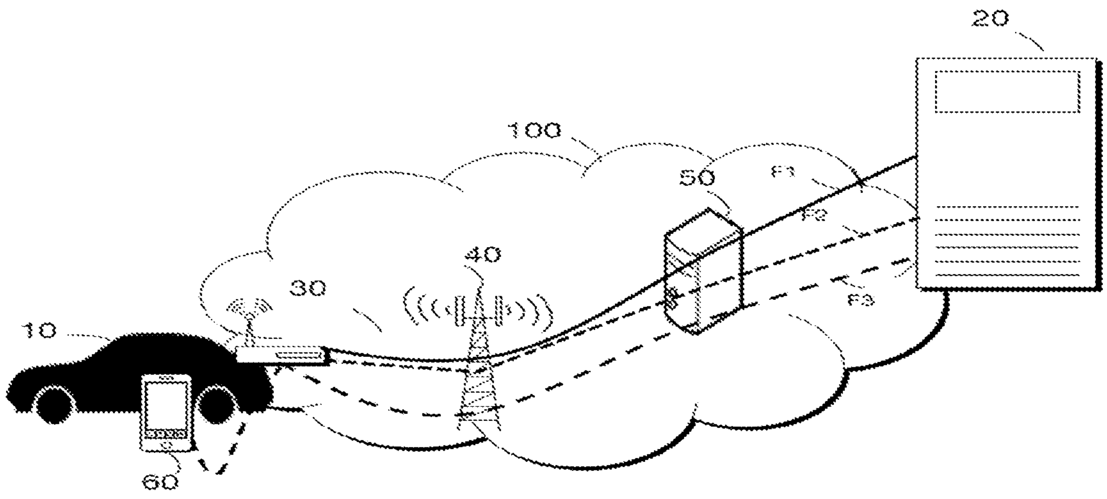
[Fig. 2]
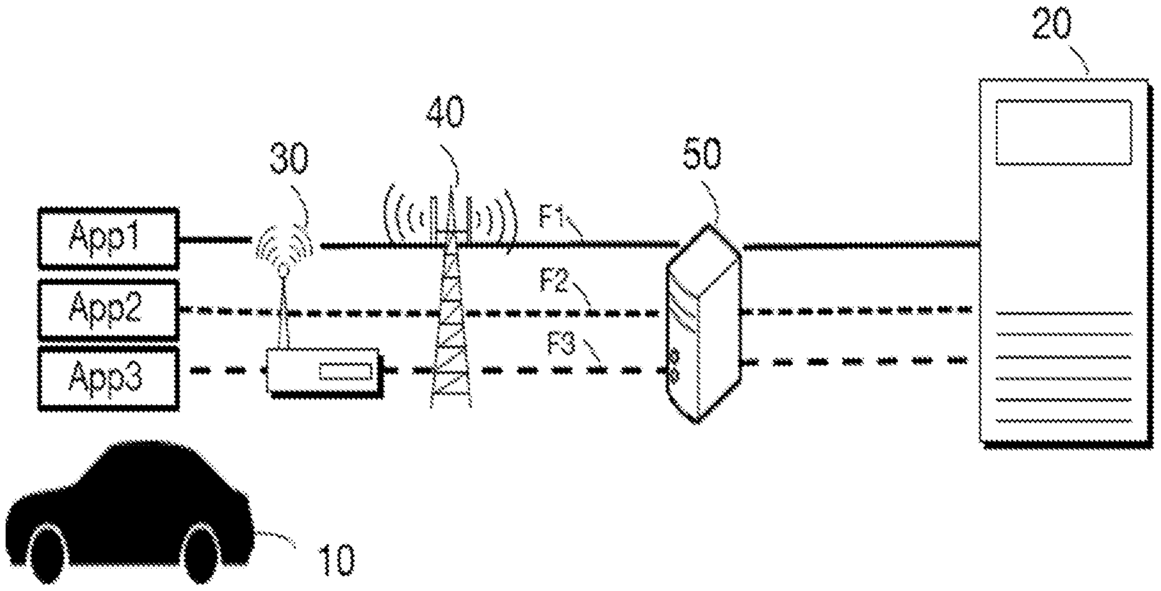

[Fig 3]
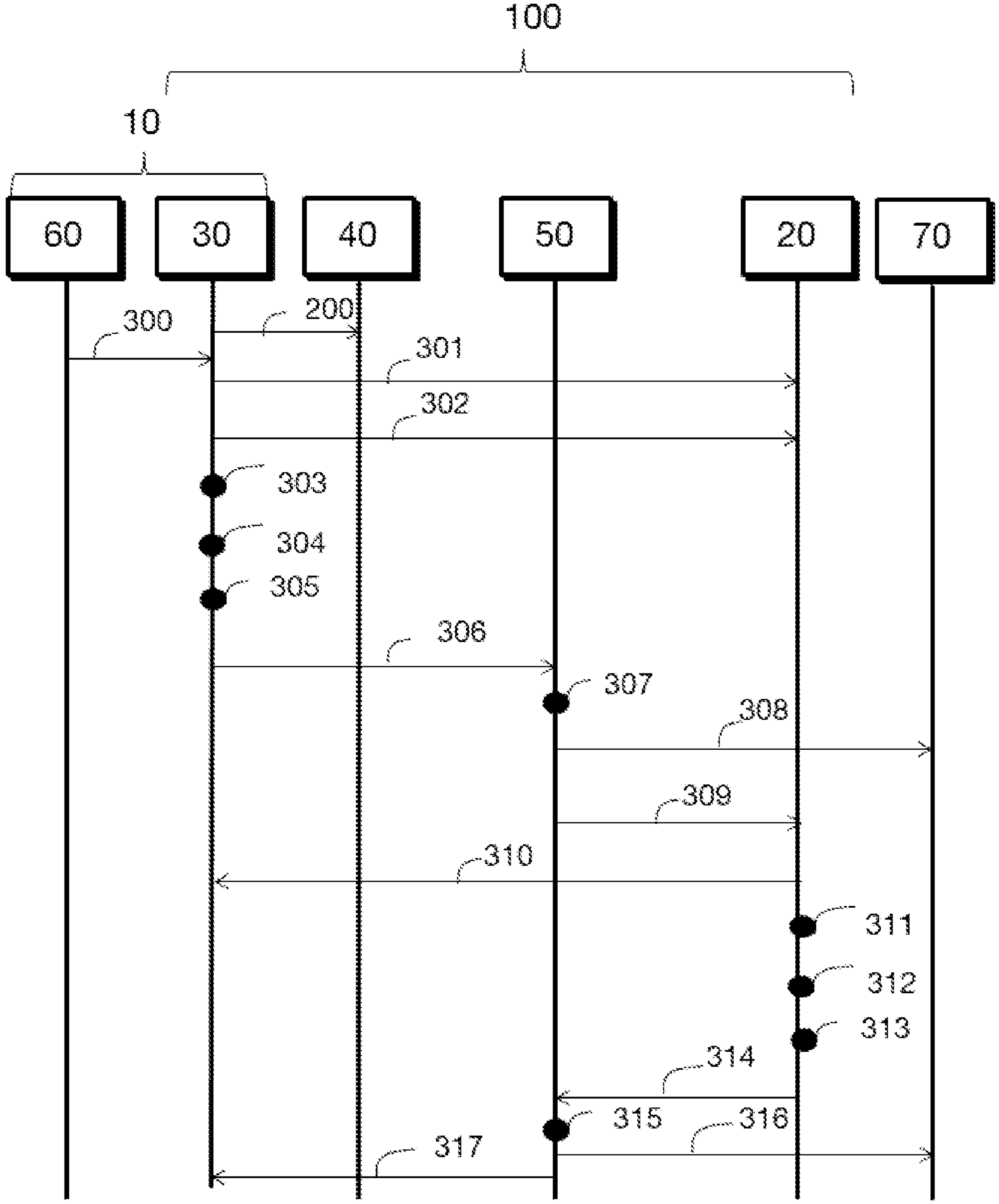

[Fig 4]
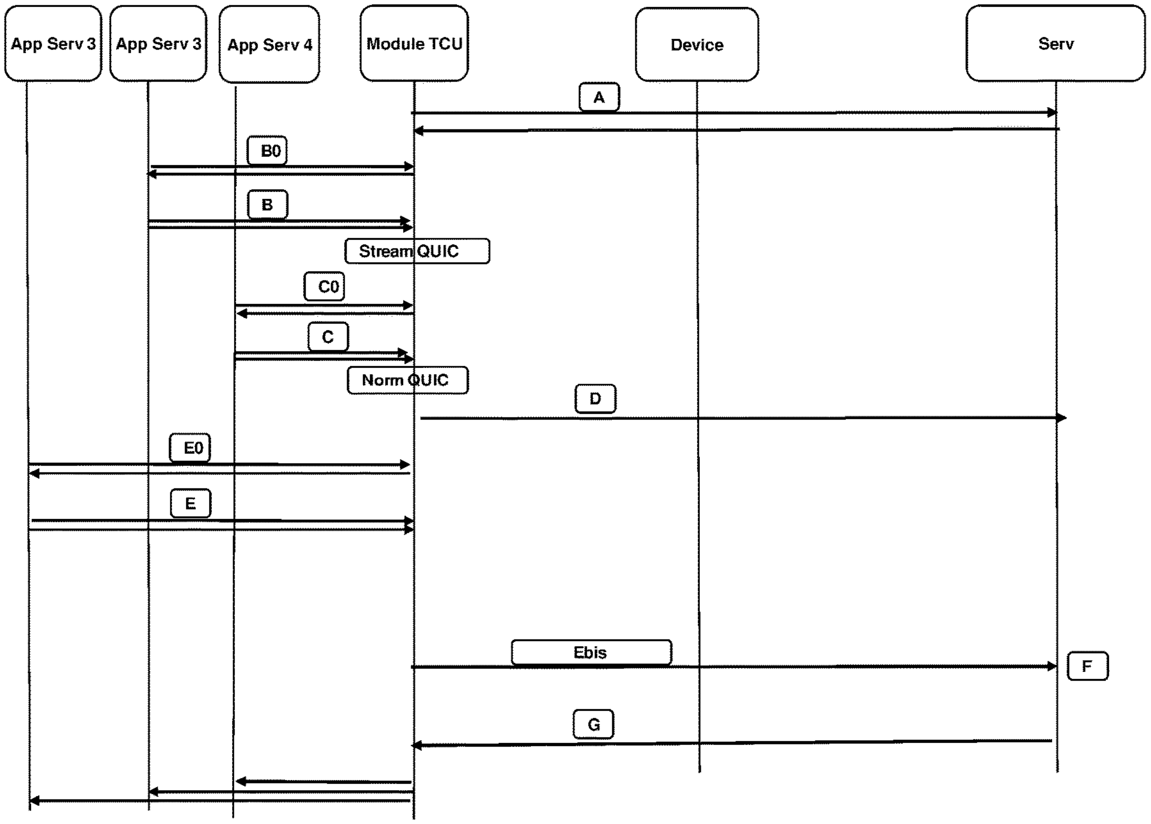

[Fig 5]
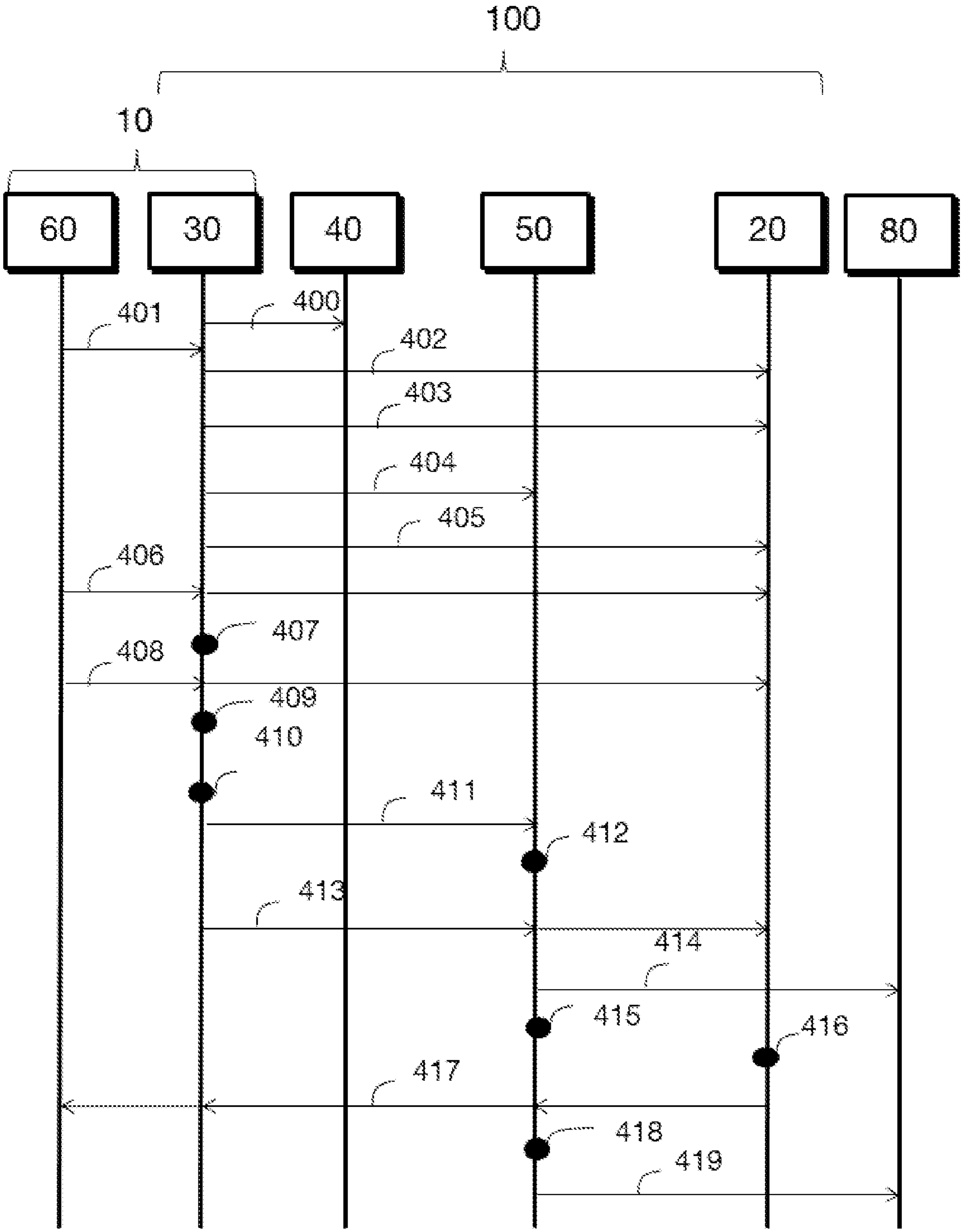

[Fig 6]
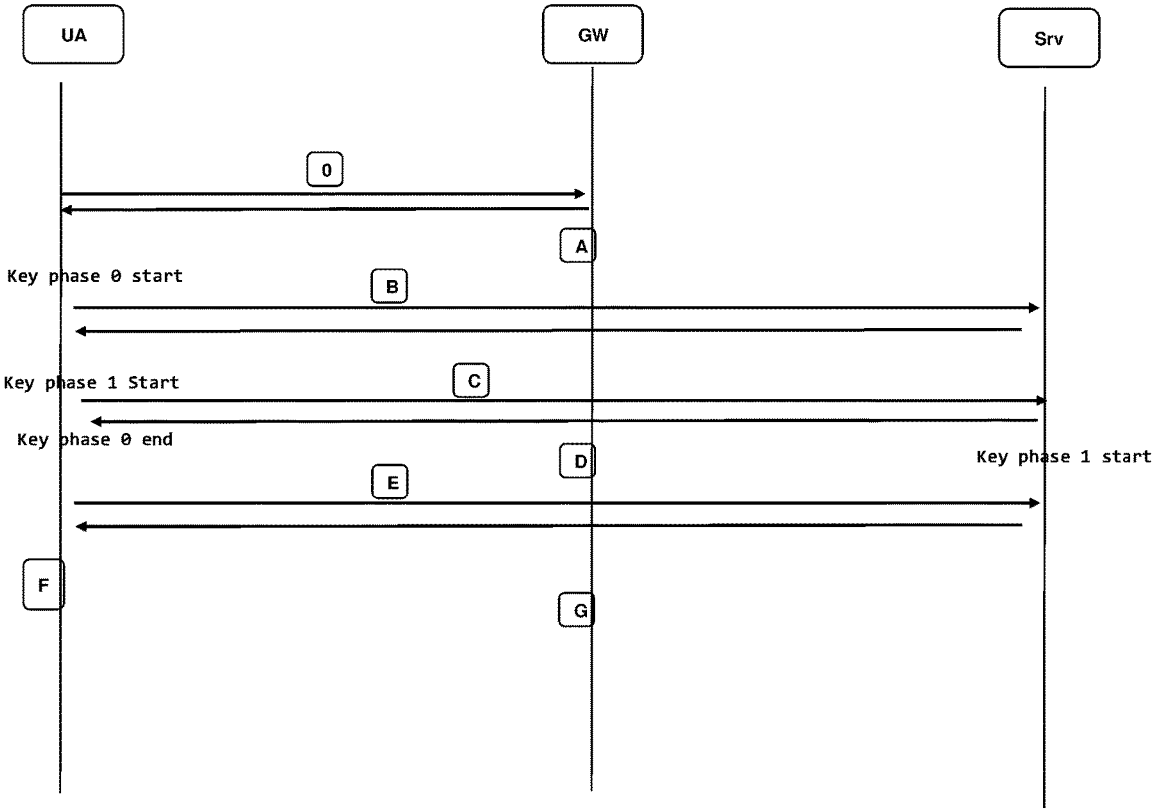

[Fig 7]
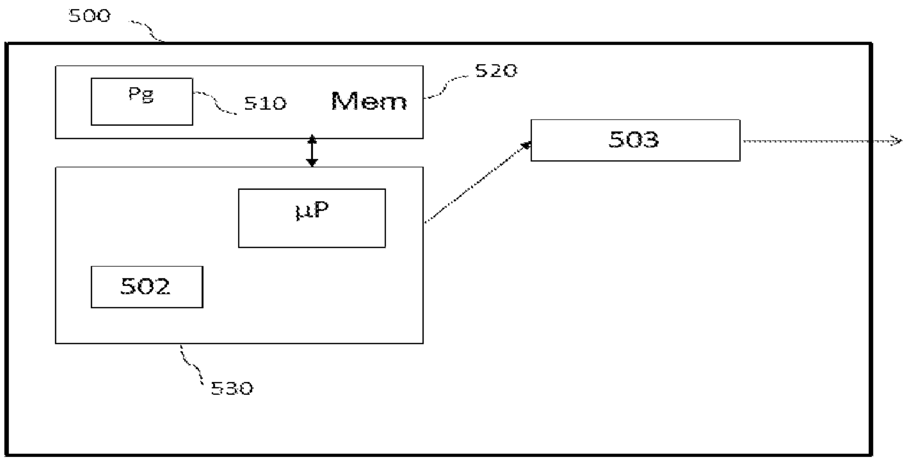
[Fig 8]
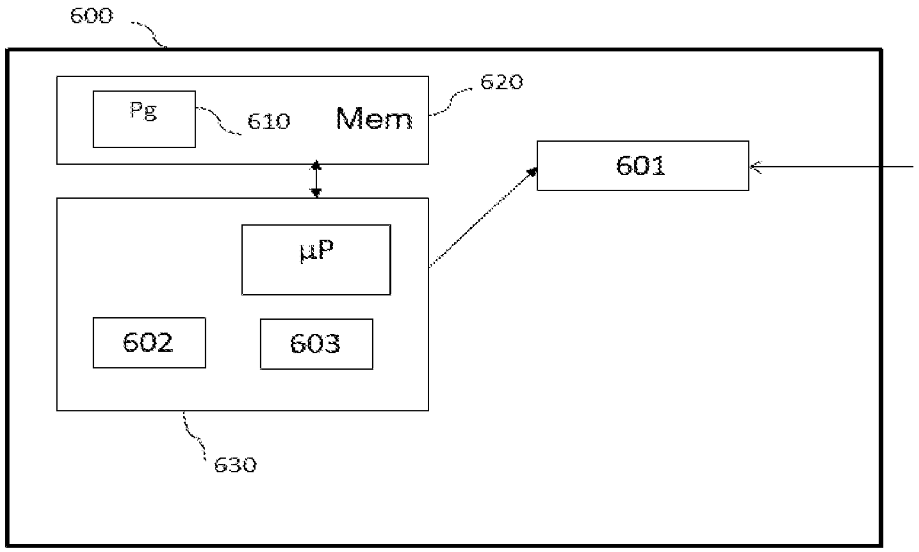

[Fig 9]
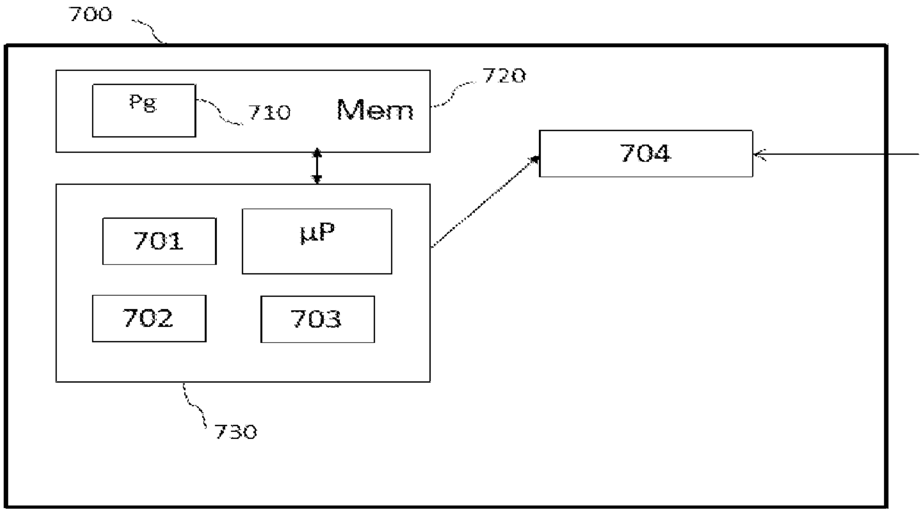
[Fig 10]
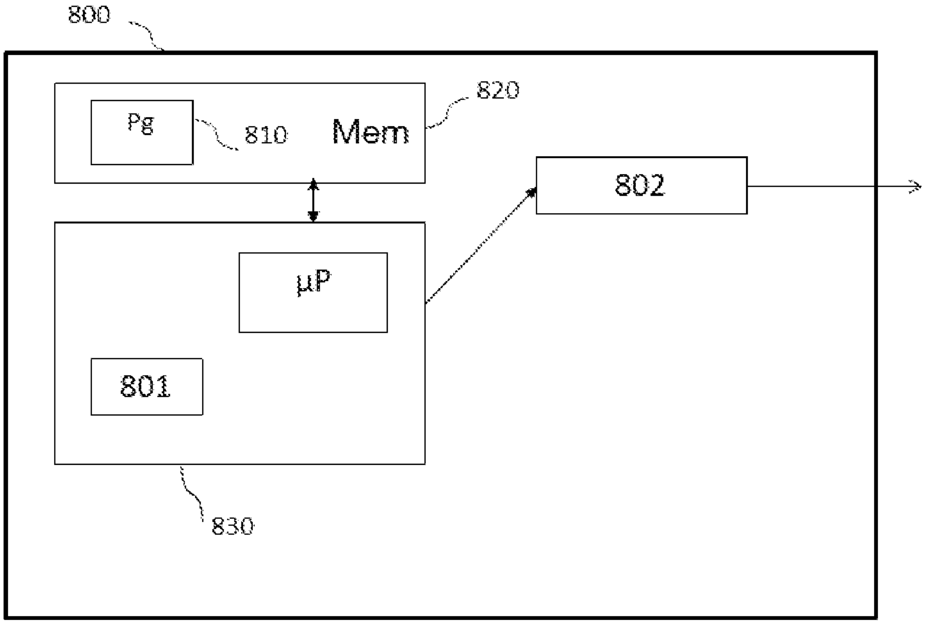

METHOD FOR DISCRIMINATING A MESSAGE BETWEEN A TERMINAL AND A DATA SERVER

CROSS-REFERENCE TO RELATED APPLICATIONS

This Application is a Section 371 National Stage Application of International Application No. PCT/FR2021/050993, filed Jun. 1, 2021, which is incorporated by reference in its entirety and published as WO 2021/245351 A1 on Dec. 9, 2021, not in English.

1. TECHNICAL FIELD

The invention relates to the transport of streams of multiplexed data in a protocol, such as a transport protocol, of a communication infrastructure and is aimed at proposing a solution to allow a processing to be applied to a specific data stream among a set of transported data streams.

2. PRIOR ART

In communication networks, data streams are increasingly routed securely, that is to say by applying authentication and confidentiality mechanisms to the data interchanged between two pairs. This security has increased with the use of the HTTP/2 (Hypertext Transfer Protocol/2) protocol transported on the TLS (Transport Layer Security) and TCP (Transmission Control Protocol) protocols and then the rapid development of the QUIC (Quick UDP Internet Communications) transport protocol. This QUIC protocol is widely used by several web browsers and application servers. QUIC combines the functions of transport, multiplexing and protection of RTP (Real-time Transport Protocol), MPTCP (MultiPath TCP), TCP, SCTP (Stream Control Transmission Protocol) and TLS protocols in a single protocol. It strengthens security by way of integrated authentication and confidentiality mechanisms for the signaling data present in the header of the packets, and key renewal mechanisms from the first interchanges of messages in the protocol (handshake process). It should furthermore be noted that the QUIC protocol is an example of a protocol having such characteristics of security and multiplexing of multiple data streams in a single connection, but these characteristics also apply to other protocols. As such, the MPTCP, HTTP3, SCTP, SPDY and HTTP2 protocols also allow multiple data streams to be multiplexed, and therefore have constraints as set out below.

An operator providing routing for the data transported in a protocol, such as QUIC, is faced firstly with a problem of identifying a stream owing to the application of a security mechanism, such as encryption, and secondly with the problem of multiplexing data streams in a single data session. This may for example occur as part of the development of vehicle data services. It should be noted that an eCall service is being rolled out in Europe. The eCall service represents an initiative of the European Commission that aims to introduce, eventually into all vehicles sold in the European Union, an automatic emergency call system (eCall) based on a public service, allowing a car that has been involved in an accident to instantaneously call the emergency services while sending a certain number of data, including its precise position, specifically whatever EU country it is in. This system, which is based on the unique European emergency number 112 and improved with geolocation, will allow faster intervention by the emergency services tailored to the severity of the accident and to the type of vehicle involved.

Automobile manufacturers have thus started rolling out eCall services in all new models that have come out since April 2018 by integrating connected boxes called TCU (telematic control unit) that are equipped with SIM cards. Now, it seems that the development of this eCall assistance service is accompanied by other services offered on the basis of such a TCU box. The services will be able to be services for assisting the driver, entertainment services or even services for controlling the vehicle. The data associated with these different services call for different processing by an operator. As such, data relating to entertainment services will be able to be billed to a customer, control data for the vehicle will be able to be duplicated in order to be used in the event of a problem, and assistance data will be able to have a high priority applied, since they must not undergo the least latency in the course of their being conveyed. These data, transmitted for example by the TCU equipment, moreover have the special feature of being routed to one or more undifferentiated servers. It seems in fact that content providers or data caching solution providers may be the sender or recipient of a plurality of data types among the various data types (assistance, entertainment, control, and so on) described above.

The document US 2005-0177506A1 describes a solution allowing streams to be differentiated for the purpose of billing associated with each stream, but the proposed solution relies on distinguishing streams according to the IP address. This solution is not effective for the problem outlined above because the streams are all regarded as coming from a single equipment, such as the TCU equipment, and therefore from a single IP address, by a routing equipment of an operator. It should be noted that the destination address does not allow the streams to be distinguished either because this address may also be common to the various multiplexed data streams if a content server or a cache server is the recipient of multiple distinct streams.

The aim of the present invention is to make improvements over the prior art.

3. SUMMARY OF THE INVENTION

The invention improves the situation by using a method for discriminating a first message concerning a first application among a set of messages concerning a plurality of applications, transmitted by a terminal equipment to a data server by way of a routing device, which is capable of applying a processing to an attribute relating to the first message, said method being implemented by the terminal equipment and comprising:

- adding an attribute relating to the first message to an information packet, said packet grouping attributes to which the processing is applied,
- applying a tag for the information packet comprising the added attribute,
- transmitting the information packet comprising the applied tag to the data server.

The method thus allows an operator administrating a device, such as a router or an equipment of DPI (deep packet inspection) type or any other equipment in a communication network, to be able to identify a message among a set of messages unambiguously and without requiring complex processing. This identification indeed becomes increasingly complex firstly because of the content servers grouping a large variety of independent services and secondly through the use of protocols multiplexing more and more messages from applications or various terminals, these applications and these terminals conveying the messages by way of a terminal equipment. In this case, the identifiers such as the IP addresses of the terminal equipment and/or of the data server are not sufficient to identify a message from an application or from a terminal with certainty. The method allows a terminal equipment to be able to identify and group certain messages, according to various attributes such as the terminal at the origin of the message, the type of application or else the application used, the quality of service relating to an application, in a specific packet. The equipment thus constructs a packet grouping the messages that will have a specific processing applied by a device in the network and applies a tag to said packet, for example by modifying a tagging parameter of this message so that, on reading this tagging parameter, the device quickly identifies this packet so as then to apply a processing to the messages added to the packet by the terminal equipment.

According to one aspect of the discrimination method, the terminal equipment transmits the plurality of messages to the data server in a secure session between the terminal equipment and the data server.

The discrimination method becomes particularly relevant when the session between the messages interchanged between the terminal equipment and the server interchanges data securely, that is to say for example via a connection providing for the confidentiality of the messages. In this case, only the equipments holding a key that allows the messages to be decrypted are able to access the content of the messages. Now, the method allows a terminal equipment to apply a tag, for example by modifying a tagging parameter, for example in an unencrypted portion of the packet comprising the messages, so that the device is able to apply a processing that calls for neither access to the content of the packet nor modification of the packet.

According to another aspect of the discrimination method, the information packet is a packet of a secure stream multiplexing protocol.

Secure stream multiplexing protocols, such as QUIC, HTTP2 or HTTP3, have advantages for implementing the discrimination method. For example, the QUIC protocol has many advantages for content providers and users in particular for its message multiplexing capabilities and its intrinsic protection of header data. The method may advantageously be implemented by adding the messages to a QUIC packet likely to be processed by the device. Indeed, this protocol is increasingly widely supported by user equipments and data servers and allows the messages to be multiplexed. The tag of such a QUIC packet allows the device to quickly differentiate the packets to be processed from the others routed to the data server without processing.

According to another aspect of the discrimination method, the secure stream multiplexing protocol is a protocol from among the following protocols: the MPTCP protocol, the SCTP protocol, the QUIC protocol, the HTTP2 protocol, the SPDY protocol, the HTTP3 protocol.

The QUIC, HTTP2 and HTTP3 protocols are increasingly used for transferring data by content providers and terminal providers. Using one of these protocols has the advantage of being able to quickly roll out this method.

According to another aspect of the discrimination method, the protocol is the QUIC protocol and the application of the tag comprises modifying binary elements among a “spin bit” and/or “reserved bits”.

The spin bit is a bit of the header of the QUIC protocol. This bit may in particular be used for computing latency for a data transmission between a transmitter and a receiver. Use of this bit, which is present in the specification of the QUIC protocol, and therefore supported by all QUIC applications but not necessarily used, in particular if the latency is not computed, allows the device to be able to quickly identify the QUIC packet to be processed.

The use of the two “reserved bits” bits makes it possible to differentiate four stream management packets, thus allowing the device to be able to apply four differentiated processings to messages included in the management packets comprising these four options. Use of the “reserved bits” bits in addition to the “spin bit” makes it possible to implement eight differentiated processings for the messages of the stream management packets. The terms spin bits and reserved bits are associated with the QUIC protocol and it is possible to envisage using bits having the same role in any secure stream multiplexing protocol.

According to another aspect of the discrimination method, the information packet comprises an attribute corresponding to a specific application.

The method may be implemented in order to apply a processing to a specific application. The terminal equipment may thus instantiate multiple stream management packets that each comprise messages relating to a specific application and for which application of the tag, here corresponding to a modified tagging parameter, is specific to the stream management packet. The device may thus apply a specific processing to the stream management packets according to the distinct parameter of each packet.

According to another aspect of the discrimination method, the terminal equipment is an equipment for accessing a local area network routing the plurality of messages from and to terminals of the local area network.

The discrimination method may advantageously be implemented by an equipment for accessing a local area network, such as an access gateway in a home network or an equipment of TCU type in a vehicle network. Indeed, the terminal equipment may discriminate between the different applications and group the messages of these different applications in distinct packets so that an equipment in the network routing the packet applies a specific processing according to a tagging parameter of the packet. According to another aspect of the invention, the discrimination method comprises, prior to adding the attribute, selecting said first message according to one or more criteria on the list:

- the first application is included in a list of applications that is managed by the terminal equipment,
- the first message is received from a terminal for which an identifier is included in a list of identifiers that is managed by the terminal equipment,
- the first message comprises a datum relating to a quality of service, said datum being included in a set of data managed by the terminal.

The discrimination method may advantageously be implemented for a limited number of applications. For example, only the applications for which the data are billed to the user are considered and the messages of these applications are added to the management packet. The method may also be instantiated for a list of terminals, independently or otherwise of the applications used by these terminals. A datum of a message, for example an IP address or else a field relating to the quality of service, may also be used to decide whether or not to add the message to the management packet, depending on whether or not the application and/or the terminal supports the application.

The various aspects of the discrimination method that have just been described may be implemented independently of one another or in combination with one another.

The invention also relates to a method for processing an attribute relating to a first message concerning a first application, said first message being transmitted by a terminal equipment to a data server, the method being implemented by a device routing the first message and capable of applying a processing to an attribute relating to the first message, comprising detecting an information packet comprising the attribute added by the terminal equipment, according to a tag applied to the received information packet, processing the attribute included in the received information packet.

The processing method affords the ability to apply a processing to a packet potentially grouping multiple messages for which a processing needs to be performed. The method thus affords the ability to apply a processing on the basis of information that is present for example in the header of a packet. As such, if payload data of the packet are encrypted, the device through which the packets pass is nevertheless able to apply a processing relating to the quality of service to the counting of certain messages among all the messages passing through the device on the basis of a tagging parameter of a packet grouping the messages concerned by the processing to be applied.

According to one aspect of the processing method, the processing comprises counting at least one datum relating to the application on the basis of the processed attribute.

In an environment in which the packets may be transmitted by applications for which the streams are billed to distinct entities, modifying a tagging parameter of a packet comprising messages relating to applications allows these packets to be billed to a specific entity. As such, for example, the tagged packets comprise messages to be billed to a vehicle manager and are easily identifiable so that they may be recorded by an intermediate device.

According to one aspect of the method of the invention, the processing method moreover comprises receiving and applying a processing relating to a second message concerning the first application, on the basis of an attribute included in a second information packet having an applied tag, said second information packet being received from the data server and to the terminal.

The processing method may advantageously be implemented for the packets transmitted by the terminal equipment and by the data server. For example, when counting the packets for billing or else for applying a specific processing to the packets, it may be necessary to apply the processing to the bidirectional streams of the packets, transmitted by the terminal equipment to the server or from the data server to the terminal equipment.

The various aspects of the processing method that have just been described may be implemented independently of one another or in combination with one another.

The invention also relates to a device for discriminating a first message concerning a first application among a set of messages concerning a plurality of applications, transmitted by a terminal equipment to a data server by way of a routing device, which is capable of applying a processing to an attribute relating to the first message, said device comprising:

a tagging module, capable of adding an attribute relating to the first message to an information packet, said packet grouping attributes to which the processing is applied, applying a tag for the information packet comprising the added attribute, a transmitter, capable of transmitting the information packet comprising the applied tag to the data server.

This device, which is capable of implementing in all of its embodiments the discrimination method that has just been described, is intended to be implemented in a device in a communication network such as an equipment for accessing a local area network, such as a home gateway, a terminal or an equipment of router type.

The invention also relates to a device for processing an attribute relating to a first message concerning a first application, said first message being transmitted by a terminal equipment to a data server, which is capable of applying a processing to an attribute relating to the first message, comprising a detector, capable of detecting an information packet comprising the attribute added by the terminal equipment, according to a tag applied to the received information packet, a processing module, capable of processing the attribute included in the received information packet.

This device, which is capable of implementing in all of its embodiments the processing method that has just been described, is intended to be implemented in a device in a communication network such as a router, a firewall, a stream inspection equipment (deep packet inspection), or even a data server.

The invention also relates to a system for processing an attribute relating to a first message concerning a first application, said first message being transmitted by a terminal equipment to a data server, comprising at least one discrimination device, and at least one processing device.

The invention also relates to computer programs comprising instructions for implementing the steps of the respective discrimination and processing methods that have just been described when these programs are each executed by a processor and a recording medium respectively readable by a discrimination device and a processing device that have recorded the computer programs.

The invention moreover improves the situation by using a method for capturing a packet of an encrypted session set up between a terminal equipment and a data server, said packet comprising a determination datum of a security key used for encrypting the packet, the method being implemented by a device routing the packet between the terminal equipment and the data server and comprising:

analyzing a plurality of packets transmitted by the terminal equipment and intended for the server, identifying a cooperation packet among the plurality of analyzed packets, said cooperation packet comprising the determination datum corresponding to a security key used for encrypting packets transmitted by the terminal equipment to the data server prior to the terminal equipment's sending said cooperation packet, decrypting the received cooperation packet by using a security key corresponding to the determination datum of the identified cooperation packet.

When a connection between a terminal equipment and a data server is secure, and in particular encrypted, it is not possible for a device providing for the routing of the data to access the content of the packets interchanged between the equipment and the server. One option for correcting this is to provide the device with the security keys used by the terminal equipment and the data server. However, such provision has the consequence of causing a security breach in the interchanges of data and calls for the keys to be systematically conveyed to the device, which is a security problem. Now, in some cases, the device needs to be able to apply a specific processing to certain packets, this processing being able to be specifically billing certain applications or conveying certain data to a regulating authority. The method thus allows the terminal equipment to insert a cooperation packet among all the packets routed by the device and to use a determination datum present in the packet, for example one or more bits positioned at a certain value identifiable by the device typically in the header of the packet, to indicate that this packet is a cooperation packet to be decrypted using a key that is determined by the determination datum of a certain value. The method thus advantageously allows the implementation of a collaboration between the terminal equipment and the device routing the data in order to allow the device to apply a processing to cooperation data conveyed by the terminal equipment. The method moreover allows a security key that is no longer used for transporting data between the terminal equipment and the data server to be reused for the collaboration between the terminal equipment and the device. The device may be a router, a firewall equipment or any other equipment providing for processing of the data of the session.

In particular, the data server may implement the actions described for the device. In this case, the data server receives the cooperation packet and processes it by using the security key corresponding to the determination datum. The encryption and decryption comprise all the modes of protection of the data that may be used to provide for the confidentiality of the packets interchanged and in particular the quantum or homographic protection techniques in particular.

According to one aspect of the capture method, the determination datum is a binary phase element indicating a change of key to be used by the terminal and the data server in order to encrypt and decrypt packets interchanged between the terminal equipment and the data server.

It is known that a phase bit is used for example in protocols so that one end of the session tells the other end about a change of security key for the data interchanged next. If such a bit was positioned at 0 and one end, such as the terminal equipment, changes it to 1 for the data conveyed to the data server from that moment on, the data server will decrypt the received data using the key corresponding to the 1 bit, corresponding to a change of phase. In this case, the key corresponding to the 0 bit is no longer used for encrypting and decrypting the data interchanged between the terminal equipment and the data server and will be able to be used for encrypting the cooperation packet conveyed to the device by the terminal equipment, in accordance with the binary phase element.

According to one aspect of the capture method, the cooperation packet is a packet of a secure data multiplexing protocol, such as the QUIC protocol, and the cooperation packet is identified on the basis of one or more of the following parameters:

- phase bit
- value of the spin-bit bit of the QUIC packet
- value of the RR bits of the QUIC packet
- connection identifier The terminal equipment is able to convey various information to the device, possibly by encrypting the various information using the security key associated with the value of the binary determination element. Using a connection identifier previously negotiated between the terminal equipment and the device, for example when interchanging an encryption/decryption key or by way of an interchange of specific messages, is advantageous. This is because it allows only the two equipments, namely the terminal equipment and the device, to have knowledge of this information. Use of the spin-bit bit and/or the RR bits of the QUIC packet may be substituted for the connection identifier used or may even complement it in order to enrich the signaling conveyed to the device and to explicitly tell the latter that what is involved is a cooperation packet calling for processing by the device.

According to one aspect of the capture method, the identification of the cooperation packet follows the activation, in the device, of a detection of the packets for which the determination datum is at a distinct value of the determination datum of a plurality of successive packets previously received from the terminal equipment.

The device is able to activate the detection of reception of cooperation packets permanently or else it may activate this detection according to an event, thus reducing the obligation for the device to use resources for activating and processing the packet following detection of a packet having the binary determination element at 0. The activation may be implemented following the device's receiving an activation message conveyed by the terminal equipment, thus telling the device that it is going to receive a cooperation packet in the next few seconds. The activation may also be implemented if the device receives multiple packets having the determination datum at a certain value, for example positioned at 1, in succession, thus telling the device that the encryption key corresponding to the value 0 is no longer used for encrypting the data conveyed to the data server but will be able to be used for sending a cooperation packet, allowing an obsolete encryption key to be reused for encrypting the data to the data server. Thus, after having received multiple successive packets with a value of the determination datum at 1, for example, reception of a packet with a value at 0 may tell the device that this is a cooperation packet.

According to one aspect of the capture method, the security key associated with the determination datum is transmitted by the terminal equipment to the device after the end of the session between the terminal equipment and the data server.

According to this embodiment, the security key corresponding for example to a binary determination element is conveyed after the terminal equipment has sent the cooperation packet and after the end of the session between the terminal equipment and the data server. This makes it possible to ensure that the security key cannot be used for another use, for example for decrypting a data packet transmitted while the session is still set up. The device backs up the cooperation packet and decrypts it by using the key conveyed once the session has finished by using the encryption key conveyed by the terminal equipment after the session has closed.

According to one aspect of the capture method, the security key associated with the determination datum was used for protecting an interchange of packets in a previous session between the terminal equipment and the data server.

Some protocols, such as QUIC or TLS, provide for periodically changing the encryption keys used for encrypting the data interchanged in sessions. The terminal equipment and the data server thus derive for example an encryption key for the new interchanges on the basis of a key previously used for interchanges in a prior session. The key used for the interchanges in a previous session is thus no longer used to derive keys for subsequent data interchanges and may advantageously be used for encrypting and sending the cooperation packet conveyed by the terminal equipment to the device. According to one aspect of the capture method, the security key associated with the determination datum is a key negotiated between the terminal equipment and the data server in a step of initializing the session.

In a session setup phase, such as a handshake phase, a security key also called the "cooperation secret" may be negotiated by the terminal equipment and the data server. This is the case in particular when there was no session between the terminal equipment and the data server before this session setup. This security key (which may be a cooperation secret) may advantageously be used for encrypting and decrypting the cooperation packet.

According to one aspect of the capture method, the cooperation packet is removed from the plurality of packets when said plurality is routed to the data server.

In one embodiment, the cooperation packet is removed from the plurality of packets sent by the terminal equipment in the session set up with the data server. In particular in the case of a unidirectional session between the terminal equipment and the data server, the cooperation packet intended for the device is of no interest to the data server. Removing it may moreover prevent the data server from malfunctioning, the latter not being supposed to receive a packet comprising a binary determination element corresponding to an encryption key that is normally no longer used for encrypting the packets between the terminal equipment and the data server.

According to one aspect of the method of the invention, the capture method moreover comprises analyzing, identifying a cooperation packet and decrypting the cooperation packet as defined above, among packets transmitted by the data server to the terminal equipment.

In particular in the case of a bidirectional session between the terminal equipment and the data server, the device may apply a processing, for example a counting operation, for the packets received from the terminal equipment but also from the data server. In this case, the implemented method will be identical to the method applied for the packets received from the terminal equipment and the device will moreover not be able to remove the cooperation packet from the packets transmitted to the data server so that the latter takes into account the existence of the cooperation packet in order to itself determine the position of a binary element of the cooperation packet transmitted to the device.

The various aspects of the capture method that have just been described may be implemented independently of one another or in combination with one another.

The invention also relates to a method for counting data relating to an application that are transmitted by a terminal equipment to a data server by way of a device, using an encrypted session between the terminal equipment and the server, the method being implemented by the terminal equipment and comprising

- transmitting a plurality of packets each comprising a determination datum of a security key used for encrypting the packet,
- incrementing a counter of the data relating to the application, for example transmitted to the data server,
- adding the incremented counter to a cooperation packet comprising the determination datum corresponding to a security key used for encrypting packets from the plurality interchanged between the terminal equipment and the data server prior to sending said cooperation packet,
- sending the cooperation packet comprising the added counter to the data server.

The counting method implemented by the terminal equipment allows the device to have information about the volume of data that is interchanged, in a unidirectional or bidirectional link between the terminal equipment and the data server, for a given application. This method thus makes it possible to overcome the problem of the device's accessing the encrypted data of the packets. This method thus allows the user to convey to the device, in a secure manner, possibly by reusing a security key previously used for the packets of the session, counting information via a counter that is incremented for each packet relating to a given application. As such, the device will then be able to apply a processing, such as billing, to the entities responsible for paying for the respective applications' packets that are conveyed and possibly received by the terminal equipment.

According to one aspect of the invention, the counting method moreover comprises sending to the device a security key corresponding to the determination datum of the cooperation packet.

In the knowledge that the security key corresponding to the binary determination element is not known by the device in most cases, the terminal equipment is able to convey this key, for example once the session between the terminal equipment and the data server has finished, so that the device is able to actually access the content of the cooperation packet.

According to one aspect of the invention, the counting method moreover comprises first sending an activation message for activating the capture method from the device to the data server.

In particular when the session between the terminal equipment and the data server is bidirectional, it may be necessary for the terminal equipment to convey to the data server an activation message for activating the capture method, thus telling the data server that it is likely to receive a packet comprising a binary element corresponding to a security key that is no longer used. This activation message will moreover be able to suggest to the data server that it itself activates the counting method corresponding to the tagging method implemented by the terminal equipment for the packets that it transmits to the terminal equipment.

The various aspects of the counting method that have just been described may be implemented independently of one another or in combination with one another.

The invention moreover relates to a device for capturing a packet of an encrypted session set up between a terminal equipment and a data server, said packet comprising a determination datum of a security key used for encrypting the packet, comprising:

- an analyzer, capable of analyzing a plurality of packets transmitted by the terminal equipment and intended for the server,
- an identification module, capable of identifying a cooperation packet among the plurality of analyzed packets, said cooperation packet comprising the determination datum corresponding to a security key used for encrypting packets transmitted by the terminal equipment to the data server prior to the terminal equipment's sending said cooperation packet,
- a decryption module, capable of decrypting the received cooperation packet by using a security key corresponding to the determination datum of the identified cooperation packet.

This device, which is capable of implementing in all of its embodiments the capture method that has just been described, is intended to be implemented in a device in a communication network such as a router, a firewall, a stream inspection equipment (deep packet inspection), or even a data server.

The invention moreover relates to a device for counting data relating to an application that are transmitted by a terminal equipment to a data server by way of a device, using an encrypted session between the terminal equipment and the server, comprising

- a transmitter, capable of transmitting a plurality of packets each comprising a determination datum of a security key used for encrypting the packet,
- a computer, capable of incrementing a counter of the data relating to the application, and capable of adding the incremented counter to a cooperation packet comprising the determination datum corresponding to a security key used for encrypting packets from the plurality interchanged between the terminal equipment and the data server prior to sending said cooperation packet,
- a transmitter, capable of transmitting the cooperation packet comprising the added counter to the data server.

This device, which is capable of implementing in all of its embodiments the counting method that has just been described, is intended to be implemented in a device in a communication network such as an equipment for accessing a local area network, such as a home gateway, a terminal or an equipment of router type.

The invention moreover relates to a system for counting data relating to an application that are transmitted by a terminal equipment to a data server by way of a device, using an encrypted session between the terminal equipment and the server comprising at least one capture device and at least one counting device.

The invention also relates to computer programs comprising instructions for implementing the steps of the respective capture and counting methods that have just been described when these programs are each executed by a processor and a recording medium respectively readable by a capture device and a counting device that have recorded the computer programs.

The programs mentioned above may use any programming language and be in the form of source code, object code or code intermediate between source code and object code, such as in a partially compiled form, or in any other desirable form.

The data media mentioned above may be any entity or device capable of storing the program. For example, a medium may comprise a storage means, such as a ROM, for example a CD ROM or a microelectronic circuit ROM, or else a magnetic recording means.

Such a storage means may for example be a hard disk, a flash memory, etc.

However, a data medium may be a transmissible medium such as an electrical or optical signal, which may be routed via an electrical or optical cable, by radio or by other means. A program according to the invention may in particular be downloaded from an Internet-type network.

Alternatively, a data medium may be an integrated circuit incorporating a program, the circuit being suitable for executing or for being used in the execution of the methods in question.

4. BRIEF DESCRIPTION OF THE DRAWINGS

Other features and advantages of the invention will become more clearly apparent from reading the following description of particular embodiments, given by way of simple illustrative and non-limiting examples, and the appended drawings, in which:

FIG. 1 shows an implementation of the discrimination method according to a first aspect of the invention, FIG. 2 shows an implementation of the method for capturing a packet according to an embodiment of the invention, FIG. 3 shows an implementation of the discrimination method according to an embodiment of the invention, FIG. 4 shows an implementation of the discrimination method according to another embodiment of the invention, FIG. 5 shows an implementation of the counting method according to an embodiment of the invention, FIG. 6 shows an implementation of the counting method according to another embodiment of the invention, FIG. 7 shows a discrimination device according to an embodiment of the invention, FIG. 8 shows a processing device according to an embodiment of the invention, FIG. 9 shows a capture device according to an embodiment of the invention, FIG. 10 shows a counting device according to an embodiment of the invention.

5. DESCRIPTION OF THE EMBODIMENTS

In the remainder of the description, embodiments of the invention in a communication infrastructure are presented. This infrastructure may be implemented to route communication data to fixed or mobile terminals, and the infrastructure, which is rolled out on the basis of specific equipments or virtualized functions, may be intended to route and process residential-customer or enterprise data.

Reference is made first of all to [FIG. 1], which shows an implementation of a discrimination method according to a first aspect of the invention. According to this first aspect, a terminal equipment 30 conveys multiple messages F1, F2, F3 to a data server 20. These messages F1, F2, F3 are routed in a network 100 comprising in particular an access equipment 40 and a device 50 routing the messages interchanged between the terminal equipment 30 and the data server 20. The messages F1, F2, F3 conveyed by the terminal equipment 20 may be transmitted by the terminal equipment 30 or else transmitted by another terminal, such as the terminal 60, and routed by the terminal equipment 30 to the data server 20 via the access equipment 40 providing for the connection of the terminal equipment 30 to the network 100 and the device 50. According to this aspect, the terminal equipment 30 is an equipment of TCU type in a vehicle 10 transmitting the messages F1 and F2 and the terminal 60 is for example a smartphone of an occupant of the vehicle transmitting the messages F3. The various messages F1, F2, F3 may call for a particular processing by the device 50 and therefore the possibility of being able to discriminate between the various messages. For example, in the knowledge that the conveyance of the messages F1, F2, F3 may be billed to distinct entities, it is necessary to be able to actually record the number of messages F1 and/or F2 and/or F3. Now, using the techniques of the prior art, it may be difficult for the device 50 to access the content of the messages F1, F2, F3 because they may be in particular encrypted. According to this aspect, in the knowledge that the messages F3 need to be billed to the occupant of the vehicle 10, the messages F3 relating to an application used by the occupant are integrated in an information packet and transmitted by the TCU 30 to the data server. To allow the device 50 to easily identify the information packet, the terminal equipment applies a tag, for example by modifying information elements of the unencrypted header of the packet, so that the device 40 is able to easily identify and process said packet among the various messages F1, F2, F3 that it needs to route. The added message F3 may correspond to the data of the application or else to data peculiar to the processing by the device 50. For example, the message F3 may correspond to the volume of data that is interchanged between the terminal 60 and the data server 20. As such, the terminal equipment 30, which may actually intervene in the messages that it transmits itself or on behalf of terminals such as the terminal 60, collaborates with the device by conveying to it information packets that may be processed by the device 50. The access equipment 40 may also play the part of the device 50 and the terminal equipment 30 may also be a residential gateway, also called a box, or else an equipment of smartphone type. The information packet comprising the messages F3 may moreover be encrypted using an encryption key and the device 50 may then decrypt the information packet received from the terminal equipment 30 by using a decryption key corresponding to the encryption key used for the encryption. It should be noted that if messages relating to distinct applications call for processing by the device 50, then the terminal equipment 30 may include in the information packet the messages relating to the two applications, by differentiating for example the various messages by way of the tag applied to the packet. As such, the tag will be able to comprise a tag peculiar to an application. For example, if messages F4, which are not shown in [FIG. 1], are transmitted by the terminal 60 to the data server 20, the terminal equipment will be able to insert the messages F3 and F4 into an information packet that the device 50 will be able to process in accordance with the tag applied by the user equipment 30.

With reference to [FIG. 2], an implementation of a method for capturing a packet according to an embodiment of the invention is shown. The entities 10, 20, 30, 40, 50 shown in this [FIG. 2] are identical to the entities 10, 20, 30, 40, 50 shown in [FIG. 1]. In this [FIG. 2], three applications App1, App2, App3 are shown. These applications App1, App2, App3 may be used or activated on the terminal equipment 30 or on a terminal, such as the terminal 60 shown in [FIG. 1]. The device 50, like the access equipment 40, routes the packets relating to the applications App1, App2, App3 transmitted by the terminal equipment 30 to the data server 20 and the packets transmitted by the data server 20 to the terminal equipment 30. An encrypted session is set up between the terminal equipment 30 and the data server 20 to route the packets. One or more encrypted sessions, for example one per application App1, App2 and App3 or one session for all of the applications App1, App2 and App3, may be implemented. The packets interchanged between the terminal equipment 30 and the data server 20 comprise a determination datum of a security key used for encrypting the packets. For example, this may be one or more bits allowing the terminal equipment 30 and the data server 20 to agree on the security key to be used for encrypting and decrypting the data and to indicate the key or a change of key by way of information provided by a determination datum, for example present in the unencrypted header of the packet. The device 50, routing the various packets interchanged between the terminal equipment 30 and the data server 20, analyzes these packets and more particularly analyzes the determination data of the keys of the packets. A succession of packets relating to the application App1 are encrypted using an encryption key, for example a private key, and the determination datum corresponding to this key has a value v1. The device 50, analyzing these data and checking that the value of the datum is unchanged, conveys these packets to the data server. Next, the device receives a packet having a determination datum having a value v0 that had been used for interchanging packets on a previous connection of the session or for sending packets in a previous protection phase for the same connection. This determination datum value v0 is no longer supposed to be used for interchanges of packets between the terminal equipment 30 and the data server, since all of the packets comprise the value v1 as determination datum. The device 50 determines whether said packet is a cooperation packet, comprising data intended for it, and decrypts the content of the packet using a decryption key corresponding to the value v0, this key no longer being used to interchange the data between the terminal equipment 30 and the data server 20. As such, an encryption key previously used for interchanging packets between the terminal equipment 30 and the data server 20 may be reused for conveying information to the device 50 in an encrypted packet using the reused key. This does not impair the end-to-end security between the terminal equipment 30 and the data server 20, since the key used for encrypting the cooperation packet conveyed by the terminal equipment 30 (or the data server 20) to the device 50 is a key that is no longer used for encrypting the packets interchanged between the terminal equipment 30 and the data server 20. The security key associated with the determination datum for which the value is v0 may be provided to the device 50 prior to sending the cooperation packet or subsequently, the device 50 being able to store the cooperation packet in order to decrypt it once the key has been received. The user equipment may thus implement a counting method allowing the device 50 to be informed about the number of packets or the volume of data or information about a session duration in a cooperation packet comprising a counter incremented for each conveyed packet, the counter being able to correspond to the number of transmitted packets, to a volume of data that is incremented for each transmitted packet, or to a duration that is incremented as soon as a new packet is transmitted. The device 50 may thus utilize the information from the counter that is included in the cooperation packet decrypted using the key corresponding to the determination datum of the cooperation packet.

Reference is now made to [FIG. 3], which shows an implementation of the discrimination method according to an embodiment of the invention. The entities 10, 20, 30, 40, 50, 60 and 100 are equivalent to the entities having the same labels in [FIG. 1] and [FIG. 2]. In particular, according to one alternative, the terminal equipment 30 is an equipment for accessing a local area network, such as a residential gateway, or an equipment for accessing a vehicle network, such as a TCU. In a step 200, the terminal equipment 30 attaches and connects to the access equipment 40. A session is considered to be set up between the terminal equipment 30 and the data server 20. According to one alternative, the session may be set up by way of a secure connection between the terminal equipment 30 and the data server 20. In a step 300, the smartphone 60 transmits a message relating to an application App1, for example a network gaming application, and intended for the data server 20 to the terminal equipment 30, and the latter conveys this message to the data server 20 in a step 301. In a step 302, the terminal equipment 30 conveys a message relating to an application App2, for example an application for managing the vehicle 10, to the data server 20. The 2 messages call for differentiated processing by the routing device 50, the message relating to the application App2 needing to be backed up by the device 50, in particular in the event of an audit for an insurance. The access equipment 40 and the device 50 route the various messages transmitted in steps 301 and 302 to the data server 20. The terminal equipment 30 holds a list of applications for which a particular action needs to be taken. For example, for the application App2, it needs to transmit a message linked to this application to the device 50. According to another example, the terminal equipment 30 identifies the messages according to the terminal transmitting these messages or even according to information, for example relating to the quality of service, in the message itself. According to this example, the terminal equipment needs to copy an attribute relating to the message to an information packet intended for the device 50.

According to one example, in an optional step 303, the terminal equipment 30 selects a message from among all the messages to be conveyed to the data server 20 according to a criterion. For example, the terminal equipment may compare the application concerned by the transmitted message. According to the example, the messages relating to the application App2 need to give rise to a specific processing by the device 50. According to another example, the terminal equipment 30 will be able to convey to the device 50 attributes relating to messages transmitted by one terminal in particular, for example from the terminal 60. According to yet another example, the terminal equipment 30 will be able to convey attributes relating to messages comprising specific routing, protocol or else quality of service or even security information. As such, all messages calling for a specific routing quality will be able to give rise to the provision of an attribute relating to the instant at which the terminal equipment 30 has transmitted the messages so that the device 50 is able to check that the messages in question have indeed been routed while complying with the quality of service criterion indicated in the messages, or else that their distribution over time corresponds to the type of application expected (by using a shallow packet inspection technique).

In a step 304, the terminal equipment 30 adds the message, according to one example, to an information packet. Multiple distinct message attributes will be able to be grouped in the information packet in order to limit the number of information packets conveyed. According to one alternative, the attribute relating to the message that has been added may correspond to a portion of the transmitted message or else to one or more pieces of information relating to the application App2, such as: the number of messages, the duration of the session between the terminal equipment 30 and the data server 20 for the application App2, the identifier of the terminal that has transmitted the messages relating to the application App2.

The information packet, according to one alternative, may comprise attributes of messages peculiar to a single application, for example if the information packet comprises only attributes relating to the application App2. However, if the same processing needs to be applied to messages of different applications, it may be advantageous to group attributes of messages relating to distinct applications but calling for identical processing by the device in the same information packet. For example, if the processing consists of counting those transmitted packets relating to two applications App4 and App5 that are billed to the same entity, attributes such as message counters relating to the applications App4 and App5 will be able to be conveyed in one information packet. The terminal equipment 30 then applies a tag for the information packet in a step 305, for example by positioning certain binary elements of the information packet at a defined value. According to one example, the information packet may be a packet of a secure stream multiplexing protocol. This type of protocol, which offers integrated protection and the possibility of multiplexing multiple streams, is particularly attractive. Indeed, if the terminal equipment 30 wishes to convey multiple information packets, each packet grouping attributes of messages calling for a specific processing, then it is possible to convey the information packets securely and by multiplexing the various information packets within a single connection between the terminal equipment 30 and the device 50. According to one example, the secure stream multiplexing protocol may be the QUIC protocol or even the HTTP2 or HTTP3 protocol. The QUIC protocol has in particular the advantage of comprising the spinbit and reserved-bits bits that may be used to apply a tag to the information packet. Binary elements of other secure stream multiplexing protocols, such as the spin bit or the reserved-bits bits of the QUIC protocol, may be indiscriminately utilized to apply a tag to the information packet.

In a step 306, the terminal equipment 30 transmits the information packet comprising one or more attributes of the messages relating to the application App2. In this embodiment, the information packet is considered to comprise the messages transmitted by the terminal equipment 30 for a period of 300 seconds. This information packet conveyed using the QUIC protocol moreover comprises the spin-bit and reserved-bits bits positioned at 1. The tagging information, allowing the received information packet to be differentiated from other packets, tells the device 50 that this is an information packet and that a processing needs to be applied to the information packet by using the attributes of messages that are present in the information packet received in step 306. In a step 307, the device 50 conveys to a backup unit 70 a message comprising the attributes of messages received in step 307 and thus allowing a history of the messages relating to the application App2 conveyed by the terminal equipment 30 to be preserved. According to one alternative, the information packet is conveyed to the data server 20 in a step 309. This may be the case in particular when the processing by the device 50 consists of duplicating the received information packet so that the sequencing of packets received by the data server 20 is not distorted or rendered incorrect by the removal of a packet from a session between the terminal equipment 30 and the data server 20.

According to one alternative, the processing may consist of counting the number of messages conveyed for an application. As such, if the billing is to be differentiated per user (owner of the vehicle 10, owner of the terminal 60, manager of the user equipment 30), it is necessary to count the messages or the volume of data that is generated by the applications and to pass on the costs associated with the number or with the volume to the user or manager using or managing the application. In this case, the attribute will be able to be a number of messages or a volume of data in the transmitted messages.

According to another example, the device 50 may also apply a processing to the messages relating to the application App2 that are conveyed by the data server 20 to the terminal equipment 30. According to this example, in a step 310, the data server 20 transmits messages relating to the application App2 to the terminal equipment 30. Steps 311 to 317 are equivalent to steps 303 to 309 described hereinabove if only the data server 20 performs the operations of the terminal equipment 30 and, reciprocally, the terminal equipment 30 performs the operations performed by the data server 20. It should be noted that the access equipment 40 may also perform some or all of the operations performed by the device 50 in addition or not in addition to the operations performed by the device 50.

With reference to [FIG. 4], an implementation of the discrimination method according to another embodiment of the invention is shown.

The discrimination method and the corresponding processing method activate an extension QFLOW_A to QUIC that forces the interchanges of QUIC packets in "stream management" mode for only the QUIC packets to be recorded as being traffic to be billed to the owner of the SIM card of the TCU module (terminal equipment) of a car: grouping QUIC messages to be recorded in tagged QUIC packets. The QFLOW_A extension modifies the use of the spin-bit field to tag the QUIC packets to be recorded by the device.

Moreover, according to one alternative, on the server, activation of the QFLOW_A extension creates in the server a stream table that is used to implement the "stream management" method for the packets transmitted by the server.

The manufacturer of the vehicle typically develops the method as OEM (original equipment manufacturer) in the tablet of the dashboard so that the OS (operating system), the web browser or the applications group the QUIC messages of the streams to be recorded in tagged QUIC packets so that the device, for example managed by a mobile operator, identifies them and records them if the processing consists of recording the messages of the streams in question.

The QFLOW_A method is described in "stream management" mode: the criterion for grouping the messages in tagged packets is the identifier of the application that generated the messages in tagged packets. It is generally applicable to other grouping modes: for example, another criterion for grouping the messages may be grouping the QUIC control messages in order to expect to be able to bill only the messages of "payload" data (that is to say not including control data of DNS type, for example) to the end customer. Other processings may consist of controlling the signaling for security purposes or routing the control messages faster in a device such as a proxy. One typical use of the product is storing the signaling in order to carry out a later inspection of the messages stored and conveyed in QUIC packets.

The method may be applied to a mode without visible tagging of the outside of the packet. A typical use of this mode is speeding up the signaling in devices of "reverse proxy" type or routing the signaling to an inspection function of DPI type (telemetry, problem analysis, security, and so on).

The discrimination method may include various modes that can be combined, such as for example:

- QFLOW_A mode: only messages transmitted by the TCU client (terminal equipment) are added to a QUIC packet that is tagged, and therefore only transmitted data are recorded as traffic billed by the manufacturer.
- QFLOW_B mode: a QUIC extension uses the transport parameter called "spin bit" to indicate that the packet needs to be recorded. This is sufficient to record the volume paid for by the manufacturer (which does not need to be billed to the owner of the car).
- QFLOW_C: a QUIC extension uses a transport parameter such as spin bit for indication and the 2 RR bits of the QUIC protocol are used to describe the identifier of an application. As such, 3 bits allow a distinction to be drawn between 8 different applications (for example waze, gmap, and so on) or another grouping criterion (identifier of the terminal, QoS criterion, and so on).

The steps of the method in this embodiment proposed in [FIG. 5] are as follows:

- Step A: create the QUIC connection between the TCU module (terminal equipment) and the server (data server) without explicitly activating the QFLOW_A extension: the server thus deduces from this that the spin bit of the QUIC protocol is used for the QFLOW_A mode;
- Steps B0 (and E0): the TCU module receives messages from the application App Serv 3 of a terminal. The TCU module knows (for example courtesy of a table of applications to be billed) that these messages need to be recorded. The TCU module therefore receives data that need to be recorded by the device. It creates a QUIC packet that will group the data to be recorded by the device. It may structure these data per application if the QUIC packet comprises data of multiple distinct applications.
- Step B: the TCU module (and more precisely the QUIC stack of the module) receives data (messages) to be recorded and to be added to a QUIC stream management packet (Stream). The QUIC stack may include the received message or merely a portion of the message, such as the source and destination addresses, the protocol type.
- Step C0: the TCU module receives messages relating to the application App Serv 4 that do not need to be recorded by the device. An untagged QUIC message (Norm QUIC) is created and will route these messages to the server, the recipient of these data.
- Step C (and step E): the QUIC stack receives data (or messages) and processes them in order to include them in the QUIC packet created in step C0. It transmits the "untagged" QUIC packet to the server.
- Step D: the server receives "untagged" QUIC packets, that is to say with a spin-bit value at 0. It should be noted that the device applies no processing to these so-called untagged packets.
- Step E: another terminal transmits messages relating to the application App Serv 3. These messages need to be recorded as indicated in step B0. When the tagged QUIC packet comprises a sufficient volume of messages and/or after a certain time after the creation of a Stream packet, the TCI module transmits the QUIC Stream packet to the server.
- Step Ebis: the device identifies the QUIC Stream packet by using the spin-bit bit tagged at 1 and applies the processing. In the present case, the device records it and adds the volume of data corresponding to the application App Serv 3 courtesy of the information transmitted in the Stream packet, that is to say the attribute relating to the application App serv 3.
- Step F: the QUIC stack of the server receives a QUIC Stream packet and processes the messages in the packet.
- Step G: the device routes QUIC packets transmitted by the server to the terminals attached to the TCU module or specifically to the TCU module but does not apply any processing because this is the QFLOW_A mode. In the QFLOW_B mode, the QUIC packets transmitted by the server are processed in accordance with the processing applied to the packets transmitted by the TCU module.

In the QFLOW_B mode, step B above is modified so that the TCU module tells the server to activate the QFLOW_B mode, thus indicating that the spin-bit bit is used to identify the transport of messages to be recorded in the QUIC packets. Steps F and G above are moreover modified as follows:

- Step F: when the server receives a QUIC packet with the spin bit at 1, it extracts the QUIC messages (in this embodiment, the messages are themselves QUIC packets) from the packet and stores a list of identifiers associated with the messages in a stream table. Next, it processes each frame:

back up identifiers;

process each QUIC Stream packet;

responses to each QUIC Stream packet;

add the response messages (or attributes relating to the response messages) to the messages received in a QUIC Stream packet;

Step G: send the QUIC Stream packet to the TCU module (indicating the address of the terminals that generated the App Serv 3 messages)

Step Gbis: the device identifies the QUIC Stream packet received from the server and applies the processing of recording the messages on the basis of the messages or the attributes that are present in the QUIC message.

The QFLOW_C mode is distinguished from the two modes above by a different identification for the stream packets. The processing applied may be distinguished according to the identification of the received stream packet. For example, the processing may be applied according to the application, according to the entity responsible for paying for the messages, according to the terminal transmitting the messages or else a combination of these criteria:

According to one example, in this QFLOW_C mode, the counting is performed according to the entity responsible for paying for the messages. The attributes of the messages are grouped in QUIC packets used for billing a particular entity.

Use of the 3 spin-bit and RR bits to distinguish between multiple counting modes The bits correspond to a billing entity for the messages:

{[name com.car.android.app, payer: enterprise A, Id: 010],
[name: com.netflix.android.app, payer: enterprise B, Id: 011],
[name: com.poki.android.app, payer: user C, Id: 110],
[name: com.sponsordata.android.app, payer: TCU manager, Id: 101].

According to another example, the counting is managed by application category. In this example, the 3 spin-bit and RR bits of the QUIC header indicate the category of the packet, that is to say a set of applications for which the messages need to be grouped and to be tagged in order to then be processed by the device. An example is proposed below:

{[name com.car.android.app, id: 100],
[name: com.netflix.android.app, id: 101],
[name: com.poki.android.app, id: 110],
[name: com.sponsordata.android.app, id: 111].

With reference to [FIG. 5], an implementation of the method for counting a packet according to an embodiment of the invention is shown.

The entities 10, 20, 30, 40, 50, 60 and 100 are equivalent to the entities having the same labels in [FIG. 1], [FIG. 2] and [FIG. 3].

In a step 400, the terminal equipment 30 attaches and connects to the access equipment 40. An encrypted session is considered to be set up between the terminal equipment 30 and the data server 20. This means that the data packets interchanged between the terminal equipment 30 and the data server 20 are encrypted using an encryption key, for example a private encryption key, and the data server decrypts the received packets using a decryption key, for example a public key, corresponding to the encryption key. Correspondingly, the packets transmitted by the data server 20 to the terminal equipment 30 are encrypted and then decrypted. In a step 401, the terminal 60 conveys packets relating to an application App4 to the terminal equipment 30 so that the latter conveys them in a step 402 to the data server 20 with which the terminal set up a session. According to one example, the application App4 is a web access application. As indicated above, the packets transmitted in step 402 are encrypted using a security key. The transmitted packets moreover comprise a determination datum informing the data server 20 about the security key actually used for encrypting the packets. According to one example, the determination datum corresponds to values of one or more binary elements of the packet header such as for example a binary phase element as defined for example in the TLS and QUIC protocols allowing the data server to be notified of a change of key, the new key being computed on the basis of an algorithm and from the key previously used for packet interchange. As such, the packets are successively interchanged using different keys, the change of key being indicated by a change of phase. The determination datum may therefore correspond to the phase change bit or even to a phase change bit and additional bits in order to allow the information relating to the key used by the terminal equipment for transmitting the packets to the data server 20 to be enriched. In a step 403, the terminal equipment 30 transmits packets relating to an application App6 to the data server 20. According to one example, the application App6 is a security application allowing the positioning of the vehicle 10 to be determined when it moves and allowing help to be organized in the event of a problem such as a vehicle breakdown or an accident.

In the remainder of the embodiment, the counting of the packets relating to an application App5, a video streaming application, is considered to need to be performed by the terminal equipment 30 so that the data relating to the video streaming service used by the terminal 60 are actually billed to the user of said service rather than to the owner of the vehicle 10, for example. This activation may be static, that is to say that a list of applications for which counting needs to be performed is held by the terminal equipment 30. This activation may also be dynamic, for example following receipt of a request transmitted by an administration platform for the applications or for the terminal equipment 30.

According to one alternative, in a step 404, the terminal equipment transmits to the device 50 an activation message for activating a method for capturing packets allowing the device to take up a listening position in order to identify cooperation packets conveyed by the terminal equipment 30, so that the packets may be counted. In this step 404, according to one example, the terminal equipment may moreover indicate a connection identifier used that will be added to the cooperation packet and that the device will actually be able to identify. Thus, among all of the packets that are routed by the device 50, it will be able to identify the cooperation packets. It should be noted that this connection identifier may be conveyed in a manner specific to the device 50 if for example no activation message is conveyed. The activation message may, according to another alternative, also comprise the decryption key that will need to be used by the device 50 in order to decrypt the cooperation packet, possibly in accordance with the connection identifier included in the message. This activation message will itself be able to be encrypted using a key initially provided to the device 50 in a message that is not shown in [FIG. 5].

According to another alternative, in a step 405, the terminal equipment transmits to the data server 20 an activation message for activating the capture method implemented by the device 50. The aim of this message is firstly to inform the data server 20 that keys initially used for encrypting packets between the terminal equipment 30 and the data server 20 will be able to be used for other purposes, for encrypting cooperation packets. This activation message is also intended to tell the data server 20 to implement the counting method so that the packets interchanged in a bidirectional session between the terminal equipment 30 and the data server 20 are counted so as for example then to be billed to the owner of the terminal 60.

In a step 406, the terminal 60 transmits a request to access a video streaming service to the data server 20 by way of the terminal equipment 30 ensuring the connection of the terminal 60 to the network 100.

In a step 407, the terminal equipment 30 initializes a counter for the packets received from the terminal 60 and relating to the application App5. The terminal equipment increments the counter with the number of packets received from the terminal 60. It should be noted that the counter may comprise the number of packets or even the volume of data corresponding to the received packets. According to one example, the counter uses the Mbits as the unit of the counter. According to one example, the terminal equipment 30 initializes one counter per terminal and increments the counter for the packets transmitted by the corresponding terminal or else uses a counter for the application App5 independently of the terminal transmitting the packets. According to another example, the counter is incremented according to the packets received from a terminal for a set of applications. As such, all the packets received from the terminal 60 will be able to be recorded. According to this example, the packets relating to the application App4 and App5 are counted by the terminal equipment 30.

In steps 408 and 409, the terminal 60 transmits new packets relating to the application App5 and the terminal equipment 30 increments the counter initialized in step 407. In a step 410, the terminal equipment 30 adds the incremented counter to a cooperation packet. This addition may take place after a period that has elapsed following the initialization of the counter, once the counter reaches a certain volume of data or packets or else following the reception of a message from a management server. The terminal equipment 30 moreover determines a determination datum to be added to the cooperation packet. According to one example, this determination datum corresponds to an encryption key previously used by the terminal equipment 30 for transmitting data to the data server 20. For example, the determination datum may be the determination datum used for sending the packets in steps 402 and/or 403, in particular if this datum is no longer used for sending the packets in steps 406 and 409, for example. According to one alternative, the cooperation packet comprises a connection identifier, as possibly indicated in the activation message in step 405. According to another example, the connection identifier comprises binary elements of a protocol, in particular of a secure data multiplexing protocol. This connection identifier may, according to one example, comprise the spin-bit and reserved-bits bits of the QUIC protocol or equivalent bits of the HTTP2 or HTTP3 protocols. The connection identifier may, according to another alternative, comprise the determination datum of the packet. According to this example, the device identifies the cooperation packet on the basis of the determination datum as indicated later on.

In a step 411, the terminal equipment conveys the cooperation packet to the data server 20 by way of the device 50. The cooperation packet comprises the determination datum of the encryption key used for encrypting the cooperation packet and also the incremented counter and possibly a connection identifier used by the device 50 to identify the cooperation packet among all the received packets.

The device 50, if it has received the activation message in step 404 or else by default as soon as it receives packets, implements an analysis of the packets received from the terminal equipment 30. This analysis may relate to the comparison of values of connection identifiers and/or of determination data of the received packets.

In a step 412, the device 50 receives the cooperation packet and identifies it using the connection identifier, if said connection identifier is present in the packet, and/or using the determination datum of the encryption key used. In the latter case, in the knowledge that the previously received packets no longer comprise this determination datum, reception of a packet comprising a distinct determination datum of the packets to be routed in a given interval of time tells the device 50 that this is a cooperation packet. According to one example, when the device 50 no longer receives packets having a value v0 as determination datum during an interval of time and begins to receive packets having a value v1, it may initialize a timer and if it receives a packet having a value v0 as determination datum again after a certain time after the initialization of the timer, it is probable that the packet is an information packet. If this determination datum corresponds to an encryption key recently used for interchanging packets between the terminal equipment 30 and the data server 20, the device 50 will not be able to decrypt this packet, which will have been wrongly identified as a cooperation packet, since it does not hold the key allowing such a packet to be decrypted. As the determination datum of the received information packet is distinguished from the determination data of the data packets received before and/or after reception of the information packet, this information packet may be detected using this determination datum. The encryption/decryption key associated with the determination datum of the information packet was able, according to one example, to be used during a previous session between the terminal equipment 30 and the data server. According to another example, a session context may be maintained between the terminal equipment 30 (or a terminal connected thereto) and the data server 20, and when a new connection is set up, the session context is re-established for example by using cookies and it is possible to reuse a key corresponding to a previous connection of one and the same session for which the context is maintained. According to yet another example, the encryption key associated with the determination datum was used for the session initialization interchanges (handshake) between the terminal equipment 30 and the data server 20. If the identification is also or only reliant on the connection identifier, then it is advisable for the device 50 to compare the value of the connection identifier with one or more values of identifiers corresponding to information packets.

According to one alternative, in particular if the device 50 has not previously received the key corresponding to the determination datum of the information packet, in a step 413 the terminal equipment conveys a key allowing the received information packet to be decrypted. This alternative makes it possible to prevent errors and the decryption of packets that are not information packets but for which the determination datum corresponds to a key that is actually used for encrypting/decrypting the data.

According to one example, in a step 414, the device conveys the counter to a billing equipment 80 providing for conversion of the counter into billing information that will be conveyed to the user of the terminal 60, the counter being able to comprise information about the application App5, the terminal having transmitted the packets or even timestamp information of the packets relating to the application App5. According to one alternative, in a step 415, the cooperation packet is removed from all of the packets to be transmitted to the data server 20. In the knowledge that the information that is present in the information packet is intended to be processed by the device, the data server 20 has no reason to receive this packet, which moreover contains a determination datum that is normally no longer used for decrypting the packets received from the terminal equipment 30.

According to one example, in a step 416, the data server 20 implements the counting method as implemented by the terminal equipment 30 and is capable of counting the packets relating to the application App5, of initializing a counter of these packets and of adding said counter to an information packet conveyed to the terminal equipment so that it is communicated to the device 50 following its identification by a determination datum, which is possibly different from the datum used by the terminal equipment 30 and/or from a connection identifier that is possibly also different from the connection identifier used for the information packets transmitted by the terminal equipment 30. In this regard, interchanges between the data server 20 and the device 50 have been able to occur previously in accordance with step 404 described above.

In a step 417, the data server 20 conveys packets relating to the application App5 via the device 50, the access equipment 40 and the terminal equipment 30, in order to convey the video content called for by the terminal 60 in step 408. In a step 416, the device 50 analyzing the packets received from the data server 20 identifies an information packet by using the information described above, and possibly stores said information packet if it does not yet have the key allowing it to be decrypted and the counter to be extracted therefrom in order to convey it to the billing equipment 80 in a step 419.

The counting method implemented by the terminal equipment 30 and possibly by the data server 20 thus allows the device 50, in cooperation with the billing equipment 80, to be able to bill for the packets and therefore the data of the application App5. The use of such methods thus allows the data relating to each application to be counted and encryption and decryption keys that are no longer used for transmitting the packets comprising the payload data of the applications, that is to say packets called for in order to access the audio, video or text content of the various applications, to be reused. With reference to [FIG. 6], an implementation of the counting method according to another embodiment of the invention is shown.

The counting method and the corresponding capture method may be implemented in accordance with multiple modes labeled RFLOW_A and RFLOW_B.

The RFLOW_A mode is a unidirectional mode that requires no modification in the server because the device removes the cooperation packets after receiving a signal from the terminal, or after a time has elapsed or even when reception of a volume of data is reached. The RFLOW_A mode thus defines a cooperation packet in an extension of the QUIC protocol that allows data to be interchanged with the device (application type, counters). The cooperation packet is encrypted using a key referred to as 1-RTT that is used in phase 0 (initialization of the session) of the QUIC protocol. The terminal equipment sends the 1-RTT key of QUIC phase 0 at the moment it desires during or after the end of the connection. The device records all or some of the messages interchanged between the terminal equipment and the data server in order to identify and decode the cooperation packets after receiving the cooperation key allowing the recorded cooperation packets to be decrypted.

The RFLOW_B mode is distinguished from the RFLOW_A RFLOW_B mode as follows. In addition to RFLOW_A, the bidirectional RFLOW_B mode activates the extension (the counting method) on the server by sending a QUIC COOP_MODE transport parameter for example at the moment at which the session between the terminal equipment and the data server is set up. As such, the server will not terminate the connection in the event of an error when it receives 1-RTT messages after the transition phase. Indeed, if it does not activate the counting method, it could consider reception of packets encrypted using a key that is normally no longer used to be an error. Moreover, the server will also be able to transmit and receive cooperation packets.

FIG. 6 describes an embodiment relating to the RFLOW_A mode.

A UA (terminal equipment) sets up a session with a data server (SRV) allowing messages (or packets) to be routed via a device (GW), for example managed by an operator of a communication network.

Step 0: The terminal UA and the device GW interchange encryption keys ENC_KEY_UA and decryption keys DEC_KEY_UA Various types of encryption/decryption keys may be used, for example:

A key referred to as external "external PSK" as defined in the document https://tools.ietf.org/html/draft-ietf-tls-tls13-cert-with-extern-psk-07 is provided to the UA by the device GW A key eSNI for the DNS eSNI recording of the FQDN of the GW as defined in the document https://tools.ietf.org/html/draft-ietf-tls-esni-05

Step A: the device activates the method for capturing the packets received from the terminal equipment UA. It should be noted that this step may be performed following reception of an activation message for activating the capture by the UA.

Step B: "handshake" messages interchanged between the UA and the SRV. The messages use keys identified by a determination datum corresponding to a phase 0. This key is the future cooperation key. It is subsequently called initial phase 0 key or else reconnection phase 0 key even if it may be any type of key as described in step 0.

Step C: data packets relating to applications, for example transmitted by terminals connected to the UA and not shown in [FIG. 6], are interchanged between the UA and the SRV. At this moment, the interchanged packets may comprise determination data corresponding to the phase in progress (0 in the example) or to a new phase (1 in the example). This is because the data packets may be encrypted using a new encryption key.

Step D: GW activates the RFLOW extension of the capture method after a time of n ms without a packet comprising a determination datum corresponding to the phase supposed to be active (0 in the example), or after n consecutive packets comprising a determination datum corresponding to the new phase (1 in the example), which should no longer be used for interchanging the packets between the UA and the SRV following the change of encryption key. From this moment on, the packets from the previous phase (for which the determination datum corresponds to phase 0) are considered to be cooperation packets and are captured, and removed from the stream of packets interchanged between the UA and the SRV by GW.

According to one example, GW uses the standard tagging bit of the QUIC inverse phase packets as determination datum.

By way of generalization, the phase (determination datum) will subsequently be inverted again and will return to phase 0. GW will then suspend the RFLOW extension from detection of a cooperation packet that it does not manage to decrypt. This packet will be transmitted to the server SRV and not stored by GW. The latter will then activate the RFLOW extension after a time of n ms without a phase packet previous to 1 or after n consecutive packets comprising a determination datum corresponding to the new phase (0 in the example). These packets from the previous phase (referred to as cooperation packets) are captured and removed from the stream by GW.

Step E: interchange of untagged data packets having a determination datum corresponding to a 1 phase Step F: count the messages (which may be packets or data of different type), and add the counter to a cooperation packet. Set the phase (determination datum) of the cooperation packet to 0. Send the cooperation packet to the GW.

Step G: capture the cooperation packet comprising the counter by identifying the 0 phase used as determination datum. It should be noted that the decryption key associated with the initial phase 0 may be sent to the GW by the UA, alternatively or in addition to the sending in step 0.

If the RFLOW_B mode is implemented: following the handshake messages interchanged or at the time at which the handshake messages are interchanged, an activation message for activating the extension (of the counting method) is conveyed to the SRV by the UA.

Moreover, in this RFLOW_B mode, the GW does not remove the cooperation packets from all of the packets routed between the UA and the SRV by the GW. The cooperation packets having a determination datum corresponding to a cooperation packet (phase 0) are therefore received by the SRV. In accordance with the sessions set up between the UA and the SRV, the server SRV transmits data to the UA, in response or otherwise to the data packets received from the UA. The SRV implements the counting method and the GW also captures the cooperation packets conveyed to the UA by the SRV by selecting the cooperation packets according to the value of the determination datum that is present in the packets that are also received from the server SRV. In this RFLOW_B mode, the UA will also receive the cooperation packets.

It should be noted that, according to the previous techniques, in the QUIC and TLS1.3 protocols, the session is reconnected by using the key that is used for the previous connection. According to this mode, the corresponding counting and capture method recycles the 0-RTT key in order to tag the cooperation packets to be identified by the GW.

When a new session is involved, that is to say that a session has not been set up previously, an implementation of the method as described below may be rolled out.

When the equipments UA and SRV set up a first connection (i.e. the extension pre_shared_key has not been activated), once the handshake has terminated and the master_secret has been obtained, the UA and the SRV derive the cooperation_secret by way of the operation:

cooperation_secret=QHKDF-Expand(master_secret, "coop *s*",hash.length)

This secret is then provided to GW, which will be able (like the UA and the SRV) to compute the key and the initialization vector (iv) by way of the following operations:

key=QHKDF-Expand(cooperation_secret,"key", key_length)

*iv*=QHKDF-Expand(cooperation_secret,"*iv*", *iv*_length)

Moreover, it should be noted that the RFLOW_A and RFLOW_B modes may be combined in order to increase the levels of cooperation by creating multiple modes for identifying the cooperation packets by way of GW:

- a spin-bit bit S identifies the cooperation packets and the RR bits (R1, R2) distinguish between multiple cooperation modes:
  - in the RFLOW_A mode, S at 1 indicates that the packet is a cooperation packet (use of DEC_KEY_UA key to decrypt it).
  - advanced options: use of the bits R1 and R2 distinguishes between 4 types of cooperation packets:
    - Read: 00 to indicate a QUIC packet that includes an area that can be read by GW;
    - Delete: 01 to indicate a QUIC packet that can be read by the gateway and needs to be removed by GW;
    - Update: 10 to indicate a QUIC packet that can be modified plainly by GW (no encryption);
    - Modif: 11 to indicate an end-to-end QUIC packet open to cooperation in write mode.

With reference to [FIG. 7], an example of the structure of a discrimination device 500 according to an embodiment of the invention is shown.

The discrimination device 500 implements the discrimination method for which various embodiments have just been described. The discrimination device may be implemented in a device in a communication network such as a terminal equipment, an equipment for accessing a local area network, such as a home gateway, a terminal or an equipment of router type.

For example, the device 500 comprises a processing unit 530, which is equipped for example with a microprocessor μP and controlled by a computer program 510 that is stored in a memory 520 and implements the discrimination method according to the invention. On initialization, the code instructions of the computer program 510 are for example loaded into a RAM memory before being executed by the processor of the processing unit 530.

Such a device 500 comprises:

- a tagging module 502, capable of
- adding an attribute relating to the first message to an information packet, said packet grouping attributes to which a processing is applied,
- applying a tag for the information packet comprising the added attribute,
- a transmitter 503, capable of transmitting the information packet comprising the applied tag to a data server.

With reference to [FIG. 8], an example of the structure of a processing device according to an embodiment of the invention is shown.

The processing device 600 implements the processing method for which various embodiments have just been described. The processing device 600 may be implemented in a device in a communication network such as a router, a firewall, a stream inspection equipment (deep packet inspection), or even a data server.

For example, the device 600 comprises a processing unit 630, which is equipped for example with a microprocessor μP and controlled by a computer program 610 that is stored in a memory 620 and implements the processing method according to the invention. On initialization, the code instructions of the computer program 610 are for example loaded into a RAM memory before being executed by the processor of the processing unit 630.

Such a device 600 comprises:

a receiver 601 capable of receiving an information packet from a terminal equipment.

a detector 602, capable of detecting an information packet comprising the attribute added by the terminal equipment, according to a tag applied to the received information packet, a processing module 603, capable of processing the attribute included in the received information packet.

With reference to [FIG. 9], an example of the structure of a capture device 700 according to an embodiment of the invention is shown.

The capture device 700 implements the capture method for which various embodiments have just been described. The capture device 700 may be implemented in a device in a communication network such as a router, a firewall, a stream inspection equipment (deep packet inspection), or even a data server.

For example, the device 700 comprises a processing unit 730, which is equipped for example with a microprocessor μP and controlled by a computer program 710 that is stored in a memory 720 and implements the capture method according to the invention.

On initialization, the code instructions of the computer program 710 are for example loaded into a RAM memory before being executed by the processor of the processing unit 730.

Such a device 700 comprises:

a receiver 704, capable of receiving a plurality of packets from a terminal equipment, an analyzer 701, capable of analyzing a plurality of packets transmitted by a terminal equipment and intended for the server, an identification module 702, capable of identifying a cooperation packet among the plurality of analyzed packets, said cooperation packet comprising the determination datum corresponding to a security key used for encrypting packets transmitted by the terminal equipment to the data server prior to the terminal equipment's sending said cooperation packet, a decryption module 703, capable of decrypting the received cooperation packet by using a security key corresponding to the determination datum of the identified cooperation packet.

With reference to [FIG. 10], an example of the structure of a counting device 800 according to an embodiment of the invention is shown.

The counting device 800 implements the counting method for which various embodiments have just been described. The counting device 800 may be implemented in a device in a communication network such as a terminal equipment or an equipment for accessing a local area network, such as a home gateway, or a terminal or an equipment of router type.

For example, the device 800 comprises a processing unit 830, which is equipped for example with a microprocessor μP and controlled by a computer program 810 that is stored in a memory 820 and implements the counting method according to the invention. On initialization, the code instructions of the computer program 810 are for example loaded into a RAM memory before being executed by the processor of the processing unit 830.

Such a device 800 comprises:

a transmitter 802, capable of transmitting a plurality of packets each comprising a determination datum of a security key used for encrypting the packet, capable of transmitting a cooperation packet comprising the added counter to the data server, a computer 801, capable of incrementing a counter of the data relating to the application, in particular transmitted to the data server, and capable of adding the incremented counter to a cooperation packet comprising the determination datum corresponding to a security key used for encrypting packets from the plurality interchanged between the terminal equipment and the data server prior to sending said cooperation packet.

The invention claimed is:

1. A discrimination method comprising:

discriminating a first message concerning a first application among a set of messages concerning a plurality of applications, transmitted by a terminal equipment to a data server by way of a routing device, which is configured to apply a processing to an attribute relating to the first message, the discriminating being implemented by the terminal equipment and comprising:

adding the attribute relating to the first message to an information packet, wherein attributes concerning said applications are grouped into information packets, and the attribute indicates that the first message corresponds to the first application, wherein the information packet includes a determination datum of a security key used for encrypting the information packet, in a case where the determination datum is a certain value, the information packet is a cooperation packet used for a cooperation between the terminal equipment and the routing device, and the cooperation packet is encrypted using an encryption key that is no longer used for encrypting data transmitted to the data server, applying a tag for the information packet comprising the added attribute, and transmitting the information packet comprising the applied tag to the data server.

2. The discrimination method, as claimed in claim 1, wherein the terminal equipment transmits the plurality of messages to the data server in a secure session between the terminal equipment and the data server.

3. The discrimination method, as claimed in claim 1, wherein the information packet is a packet of a secure stream multiplexing protocol.

4. The discrimination method, as claimed in claim 3, wherein the secure stream multiplexing protocol is a protocol from among the following protocols: the MPTCP protocol, the SCTP protocol, the QUIC protocol, the HTTP2 protocol, the SPDY protocol, the HTTP3 protocol.

5. The discrimination method, as claimed in claim 3, wherein the secure stream multiplexing protocol is the QUIC protocol and the application of the tag comprises modifying binary elements among a "spin bit" and/or "reserved bits".

6. The discrimination method, as claimed in claim 1, wherein the terminal equipment is an equipment configured to access a local area network routing the plurality of messages from and to terminals of the local area network.

7. The discrimination method, as claimed in claim 1, further comprising, prior to adding the attribute, selecting said first message according to one or more criteria consisting of:

the first application is included in a list of applications that is managed by the terminal equipment, the first message is received from a terminal for which an identifier is included in a list of identifiers that is managed by the terminal equipment, the first message comprises a datum relating to a quality of service, said datum being included in a set of data managed by the terminal.

8. A processing method comprising:

processing an attribute relating to a first message concerning a first application, said first message being transmitted by a terminal equipment to a data server, the processing being implemented by a device routing the first message and comprising:

detecting a received information packet comprising the attribute added by the terminal equipment, according to a tag applied to the received information packet, wherein attributes concerning different applications are grouped into information packets, and the attribute indicates that the first message corresponds to the first application, wherein the information packet includes a determination datum of a security key used for encrypting the information packet, in a case where the determination datum is a certain value, the information packet is a cooperation packet used for a cooperation between the terminal equipment and the routing device, and the cooperation packet is encrypted using an encryption key that is no longer used for encrypting data transmitted to the data server, and processing the attribute included in the received information packet.

9. The processing method, as claimed in claim 8, wherein the processing comprises counting at least one datum relating to the application on the basis of the processed attribute.

10. The processing method, as claimed in claim 8, further comprising receiving and applying a processing relating to a second message concerning the first application, on the basis of an attribute included in a second information packet having an applied tag, said second information packet being received from the data server and aimed the terminal.

11. A device comprising:

a processor; and a non-transitory computer readable medium comprising instructions stored thereon which when executed by the processor configure the device to discriminate a first message concerning a first application among a set of messages concerning a plurality of applications, transmitted by a terminal equipment to a data server by way of a routing device, which is configured to apply a processing to an attribute relating to the first message, wherein discriminating the first message comprises:

adding the attribute relating to the first message to an information packet, wherein attributes concerning said applications are grouped into information packets, and the attribute indicates that the first message corresponds to the first application, wherein the information packet includes a determination datum of a security key used for encrypting the information packet, in a case where the determination datum is a certain value, the information packet is a cooperation packet used for a cooperation between the terminal equipment and the routing device, and the cooperation packet is encrypted using an encryption key that is no longer used for encrypting data transmitted to the data server, and applying a tag for the information packet comprising the added attribute; and a transmitter to transmit the information packet comprising the applied tag to the data server.

12. A device comprising:

a processor; and a non-transitory computer readable medium comprising instructions stored thereon which when executed by the processor configure the device to process an attribute relating to a first message concerning a first application, said first message being transmitted by a terminal equipment to a data server, wherein processing comprises:

detecting a received information packet comprising the attribute added by the terminal equipment, according to a tag applied to the received information packet, wherein attributes concerning different applications are grouped into information packets, and the attribute indicates that the first message corresponds to the first application, wherein the information packet includes a determination datum of a security key used for encrypting the information packet, in a case where the determination datum is a certain value, the information packet is a cooperation packet used for a cooperation between the terminal equipment and the routing device, and the cooperation packet is encrypted using an encryption key that is no longer used for encrypting data transmitted to the data server, and processing the attribute included in the received information packet.

13. A non-transitory computer readable medium comprising a computer program stored thereon including instructions for implementing a discrimination method when the program is executed by a processor of a terminal equipment, the discrimination method comprising:

discriminating a first message concerning a first application among a set of messages concerning a plurality of applications, transmitted by a terminal equipment to a data server by way of a routing device, which is configured to apply a processing to an attribute relating to the first message, the discriminating comprising:

adding the attribute relating to the first message to an information packet, wherein attributes concerning said applications are grouped into information packets, and the attribute indicates that the first message corresponds to the first application, wherein the information packet includes a determination datum of a security key used for encrypting the information packet, in a case where the determination datum is a certain value, the information packet is a cooperation packet used for a cooperation between the terminal equipment and the routing device, and the cooperation packet is encrypted using an encryption key that is no longer used for encrypting data transmitted to the data server, applying a tag for the information packet comprising the added attribute, and transmitting the information packet comprising the applied tag to the data server.

14. A non-transitory computer readable medium comprising a computer program stored thereon including instructions for implementing a processing method when the program is executed by a processor of a device, the processing method comprising:

processing an attribute relating to a first message concerning a first application, said first message being transmitted by a terminal equipment to a data server and being routed by the device, the processing comprising:

detecting a received information packet comprising the attribute added by the terminal equipment, according to a tag applied to the received information packet, wherein attributes concerning different applications are grouped into information packets, and the attribute indicates that the first message corresponds to the first application, wherein the information packet includes a determination datum of a security key used for encrypting the information packet, in a case where the determination datum is a certain value, the information packet is a cooperation packet used for a cooperation between the terminal equipment and the routing device, and the cooperation packet is encrypted using an encryption key that is no longer used for encrypting data transmitted to the data server, and processing the attribute included in the received information packet.

* * * * *